US012580391B2

(12) United States Patent
Jeong et al.

(10) Patent No.: US 12,580,391 B2
(45) Date of Patent: Mar. 17, 2026

(54) SYSTEM FOR CHARGING VEHICLE BATTERY USING MOTOR DRIVING SYSTEM

(71) Applicants:Hyundai Motor Company, Seoul (KR); Kia Corporation, Seoul (KR)

(72) Inventors: Kang Ho Jeong, Hwaseong-si (KR); Myung Ho Kim, Incheon (KR); Sang Cheol Shin, Suwon-si (KR); Young Seul Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 880 days.

(21) Appl. No.: 17/828,448

(22) Filed: May 31, 2022

(65) Prior Publication Data

US 2022/0416560 A1    Dec. 29, 2022

(30) Foreign Application Priority Data

Jun. 24, 2021    (KR) ........................ 10-2021-0082638

(51) Int. Cl.
*H02J 7/14*        (2006.01)
*B60L 53/24*        (2019.01)

(52) U.S. Cl.
CPC ................ *H02J 7/14* (2013.01); *B60L 53/24* (2019.02); *B60L 2210/40* (2013.01)

(58) Field of Classification Search
CPC .............................. B60L 2210/40; B60L 53/24
See application file for complete search history.

(56) References Cited

U.S. PATENT DOCUMENTS

| | | | | |
|---|---|---|---|---|
| 11,303,145 | B2 * | 4/2022 | Shimizu | .................... H02J 7/02 |
| 2020/0195032 | A1 * | 6/2020 | Shimizu | ................ H02J 7/0024 |
| 2020/0298722 | A1 * | 9/2020 | Smolenaers | ............ H02J 7/345 |

(Continued)

FOREIGN PATENT DOCUMENTS

| | | |
|---|---|---|
| CN | 103081347 A | 5/2013 |
| CN | 108539833 A | 9/2018 |
| CN | 112389232 A | 2/2021 |

(Continued)

OTHER PUBLICATIONS

Extended European Search Report dated Nov. 21, 2022, issued in corresponding European Patent Application No. 22176664.5.

*Primary Examiner* — Julian D Huffman
*Assistant Examiner* — Sadia Kousar
(74) *Attorney, Agent, or Firm* — Morgan, Lewis & Bockius LLP

(57)        ABSTRACT

A system for charging a vehicle battery using a motor driving system is proposed. The battery charging system includes a first inverter including a plurality of first switching elements; a second inverter including a plurality of second switching elements; a plurality of transfer switches having first ends and second ends, the first ends thereof being respectively connected to the second ends of a plurality of windings, and the second ends thereof being connected to each other; and a controller configured, in a charging mode, to control a connection state between a DC terminal of the first inverter and a DC terminal of the second inverter, and opened/shorted states of the plurality of first switching elements, the plurality of second switching elements, and the plurality of transfer switches.

16 Claims, 3 Drawing Sheets

(56)                 References Cited

U.S. PATENT DOCUMENTS

| | | |
|---|---|---|
| 2021/0044135 A1 | 2/2021 | Lee et al. |
| 2021/0146792 A1* | 5/2021 | Lehn ................... H02M 3/1552 |

FOREIGN PATENT DOCUMENTS

| | | |
|---|---|---|
| KR | 10-2021-0008974 A | 1/2021 |
| KR | 10-2021-0027673 A | 3/2021 |
| KR | 10-2021-0122343 A | 10/2021 |

* cited by examiner

SYSTEM FOR CHARGING VEHICLE BATTERY USING MOTOR DRIVING SYSTEM

CROSS REFERENCE TO RELATED APPLICATION

The present application claims the benefit of priority to Korean Patent Application No. 10-2021-0082638, filed on Jun. 24, 2021 in the Korean Intellectual Property Office, the entire contents of which is incorporated herein for all purposes by reference.

BACKGROUND

Technical Field

The present disclosure relates to a system for charging a vehicle battery using a motor driving system and, more particularly, to a system for charging a vehicle battery using a motor driving system, the battery charging system being capable of charging a vehicle battery using an open end winding motor driving system, the motor driving system being configured to drive a motor using a plurality of inverters that are respectively connected to opposite ends of windings in the motor.

Description of the Related Art

Fuel efficiency (or electricity efficiency) of an eco-friendly vehicle, such as an electric vehicle, that uses torque generated by a motor as power is determined by power conversion efficiency of an inverter-motor. Therefore, it is important to maximize the power conversion efficiency of the inverter and efficiency of the motor so as to improve the fuel efficiency.

The applicant of the present application has proposed a technique for driving a motor by selectively determining a closed end winding mode and an open end winding mode. The closed end winding mode is configured such that one ends of windings in a driving motor of a vehicle are connected to each other to form a Y-connection to drive the motor, and the open end winding mode is configured such that inverters are respectively connected to opposite ends of the windings of the motor to drive the motor with an open state of the opposite ends of the motor windings.

In general, in an electric vehicle or a plug-in hybrid electric vehicle, power supplied from external charging equipment is converted into a state suitable for charging a vehicle battery and the converted power is supplied to the battery to charge the battery.

Conventionally, charging equipment for fast charging is manufactured to output a single voltage specification of 400V. However, batteries used in vehicles tend to be designed to have a voltage of 800V or higher in order to improve efficiency and driving range. In order to charge a vehicle battery having various voltage specifications, charging facilities having various voltage bands that meet the battery voltage specifications should be provided. Otherwise, charging equipment should be realized to enable outputs of various voltage bands.

Therefore, construction for the charging infrastructure is costly. In addition, when voltage is lowered and output due to a charging current limitation of charging equipment, charging time may increase as the charging power decreases.

In the technical field of the present disclosure, with a motor driving system for driving a motor in an open end winding mode using a plurality of inverters, there is a demand for a battery charging technique capable of charging a battery by converting the magnitude of the charging voltage supplied by the charging equipment built as the existing infrastructure without an additional device and an increase in additional cost.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problem occurring in the related art, and the present disclosure is intended to provide a system for charging a vehicle battery using a motor driving system, in which the battery charging system is capable of charging a battery by appropriately converting magnitude of charging voltage supplied from external charging equipment using a motor driving system for driving a motor at an open end winding mode without using a separate dedicated converting device.

In order to achieve the above objective, according to one aspect of the present disclosure, a system for charging a vehicle battery using a motor driving system, configured to drive a motor having a plurality of windings respectively corresponding to a plurality of phases of the motor, is provided. The vehicle battery charging system may include: a first inverter including a plurality of first switching elements, and including a DC terminal connected to the battery and an AC terminal connected to a first end of each of the plurality of windings; a second inverter including a plurality of second switching elements, and including a DC terminal that may be selectively short/open-circuited to the DC terminal of the first inverter and an AC terminal connected to a second end of each of the plurality of windings; a plurality of transfer switches having first ends and second ends, the first ends of the transfer switches being respectively connected to the second ends of the plurality of windings, and the second ends of the transfer switches being connected to each other; and a controller configured, in a charging mode in which the battery may be charged, to control a connection state between the DC terminal of the first inverter and the DC terminal of the second inverter, and opened/shorted states of the plurality of first switching elements, the plurality of second switching elements, and the plurality of transfer switches, based on a magnitude of DC charging voltage applied to a portion between the second ends of the plurality of transfer switches and a negative terminal of the battery and of a magnitude of voltage of the battery.

The vehicle battery charging system may further include: a first charging powering switch having a first end connected to the second ends of the plurality of transfer switches and a second end receiving high potential of the DC charging voltage, and a second charging powering switch having a first end connected to the negative terminal of the battery and a second end receiving low potential of the DC charging voltage, in which the controller may be configured, in the charging mode, to control the first charging powering switch and the second charging powering switch to be short-circuited.

The vehicle battery charging system may further include: a capacitor connected to a portion between the second end of the first charging powering switch and the negative terminal of the battery.

When the external charging voltage is lower than the voltage of the battery, the controller may be configured, in the charging mode, to boost the DC charging voltage by controlling at least some of the plurality of transfer switches to be short-circuited, and by controlling pulse width modulation of a lower switching element of the first inverter, which may be connected to a winding of the plurality of windings connected to a short-circuited switch among the plurality of transfer switches, in which the lower switching element of the first inverter may be a switching element connected to a low potential terminal of the DC terminal of the first inverter, among the plurality of first switching elements.

When the external charging voltage is lower than the voltage of the battery, the controller may be configured, in the charging mode, to boost the DC charging voltage by controlling all the plurality of transfer switches to be short-circuited, and by controlling pulse width modulation of a lower switching element of the first inverter, in which among the plurality of first switching elements, the lower switching element of the first inverter may be a switching element connected to a low potential terminal of the DC terminal of the first inverter.

The controller may be configured, in the charging mode, to control the plurality of second switching elements to be open-circuited.

When the external charging voltage is greater than the voltage of the battery, the controller may be configured, in the charging mode, to step down the DC charging voltage by electrically opening the DC terminal of the first inverter and the DC terminal of the second inverter to each other, and by opening the first switching elements and the second switching elements, and by controlling pulse width modulation of at least some of the plurality of transfer switches.

The vehicle battery charging system may further include a third charging powering switch having a first end connected to the DC terminal of the first inverter and a second end connected to the DC terminal of the second inverter.

When the external charging voltage is greater than the voltage of the battery, the controller may be configured, in the charging mode, to step down the DC charging voltage by opening the third charging powering switch, by opening the first switching elements and the second switching elements, and by controlling pulse width modulation of at least some of the plurality of transfer switches.

According to another aspect of the present disclosure, a system for charging a vehicle battery using a motor driving system, configured to drive a motor having a plurality of windings respectively corresponding to a plurality of phases of the motor, may include: a first inverter including a plurality of first switching elements, and including a DC terminal connected to the battery and an AC terminal connected to a first end of each of the plurality of windings; a second inverter including a plurality of second switching elements, and including a DC terminal that may be selectively short/open-circuited to the DC terminal of the first inverter and an AC terminal connected to a second end of each of the plurality of windings; a plurality of transfer switches having first ends and second ends, the first ends of the transfer switches being respectively connected to the second ends of the plurality of windings, and the second ends of the transfer switches being connected to each other; a first charging powering switch having a first end connected to the second ends of the plurality of transfer switches and a second end receiving high potential of the DC charging voltage supplied from an outside of the system; a second charging powering switch having a first end connected to the negative terminal of the battery and a second end receiving low potential of the DC charging voltage; a third charging powering switch having a first end connected to the DC terminal of the first inverter and a second end connected to the DC terminal of the second inverter; and a controller configured, in a charging mode in which the battery may be charged, to control at least some of the plurality of transfer switches and the first and second charging powering switches to be short-circuited, the controller being configured, based on a magnitude of the DC charging voltage, to control opened/shorted states of the third charging powering switch, the plurality of first switching elements, the plurality of second switching elements, and the plurality of transfer switches.

The vehicle battery charging system may further include a capacitor connected to a portion between the second end of the first charging powering switch and the negative terminal of the battery.

When the external charging voltage is lower than the voltage of the battery, the controller may be configured, in the charging mode, to boost the DC charging voltage by controlling at least some of the plurality of transfer switches to be short-circuited, and by controlling pulse width modulation of a lower switching element of the first inverter, which may be connected to a winding of the plurality of windings connected to a shorted switch among the plurality of transfer switches, in which among the plurality of first switching elements, the lower switching element of the first inverter may be a switching element connected to a low potential terminal of the DC terminal of the first inverter.

When the external charging voltage is lower than the voltage of the battery, the controller may be configured, in the charging mode, to boost the DC charging voltage by controlling all the plurality of transfer switches to be short-circuited, and by controlling pulse width modulation of a lower switching element of the first inverter, in which among the switching elements included in the first inverter, —the lower switching element of the first inverter may be a switching element connected to a low potential terminal of the DC terminal of the first inverter.

The controller may be configured, in the charging mode, to control the plurality of second switching elements to be open-circuited.

When the external charging voltage is greater than the voltage of the battery, the controller may be configured, in the charging mode, to step down the DC charging voltage by opening the third charging powering switch, and by opening the first switching elements and the second switching elements, and by controlling pulse width modulation of at least some of the plurality of transfer switches.

According to the system for charging a vehicle battery using a motor driving system, it is possible to enable the battery to be charged by appropriately converting the magnitude of the charging voltage in response to the charging voltage supplied from the external charger by using the motor driving system provided for the open end winding operation of the motor.

With the vehicle using the system for charging a vehicle battery using a motor driving system, it is not necessary to provide additional infrastructure for additional high-voltage charging facilities in the vehicle, as the voltage of the vehicle battery increases. Therefore, social costs caused by infrastructure construction can be prevented.

Furthermore, the system for charging a vehicle battery using a motor driving system is configured such that, when the charging voltage supplied from the charging equipment is higher than the voltage of the battery, instead of stepping down the voltage of the charging equipment having a current limitation, the charging system can step down the magnitude of the voltage by using the motor driving system provided in the vehicle. Therefore, the problem of charging power reduction that occurs when the charging voltage is stepped down at the charging equipment can be solved, whereby the problem in that the battery charging time increases due to the charging voltage step-down can be solved.

In addition, the system for charging a vehicle battery using a motor driving system can allow the battery charging corresponding to various types of external charging voltage while allowing the motor to be driven in the high-efficiency open end winding manner.

Effects of the present disclosure are not limited to the above-mentioned effects, and those skilled in the art will clearly understand other effects not mentioned in consideration of a following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, a system for charging a vehicle battery using a motor driving system according to various embodiments of the present disclosure will be described in detail with reference to accompanying drawings.

Figure 1:
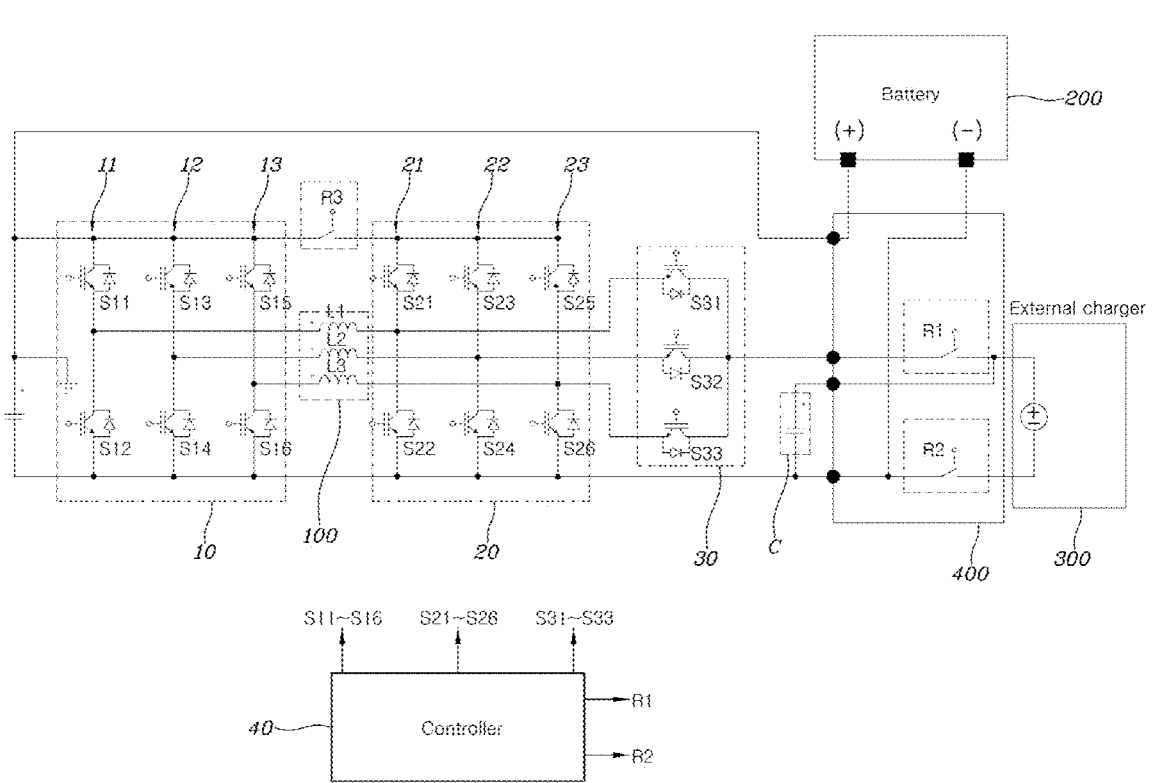
FIG. 1 is a circuit diagram showing a system for charging a vehicle battery using a motor driving system according to an embodiment of the present disclosure.

FIG. 1 is a circuit diagram showing a system for charging a vehicle battery using a motor driving system according to an embodiment of the present disclosure.

Referring to FIG. 1, according to the embodiment of the present disclosure, the system for charging a vehicle battery using a motor driving system is a charging system using a motor driving system supplying driving power by a motor 100 having a plurality of windings L1 to L3 respectively corresponding to a plurality of phases.

The system for charging the vehicle battery may include: a first inverter 10 including a plurality of first switching elements S11 to S16 and connected to a first end of each of the windings of the motor 100; a second inverter 20 including a plurality of second switching elements S21 to S26 and connected to a second end of each of the windings of the motor 100; and a plurality of switching elements S31 to S33 of which first ends are connected to second ends of the windings of the motor 100 and second ends are short-circuited to each other.

The first inverter 10 may have a DC terminal to which DC voltage generated between a positive terminal and a negative terminal of the battery 200 is applied, and an AC terminal connected to each of the windings L1 to L3 of the motor 100. Two nodes where the first inverter 10 is connected to the positive terminal and the negative terminal of the battery 200 may be the DC terminal. Three notes where the first inverter 10 is connected to the first end of each of the windings of the motor 100 may be the AC terminal.

Similarly, the second inverter 20 may have a DC terminal selectively connected to the DC terminal of the first inverter 10 and an AC terminal connected to each of the windings L1 to L3 of the motor 100. Two nodes including one node where the second inverter 20 is selectively connected to the DC terminal of the first inverter 10 may be the DC terminal of the second inverter 20. Three notes where the second inverter 20 is connected to the second end of each of the windings of the motor 100 may be the AC terminal of the second inverter 20.

The DC terminal of the first inverter 10 and the DC terminal of the second inverter 20 may be selectively open/short-circuited to or from each other by a charging powering switch R3. An operating condition of the charging powering switch R3 may be controlled by a controller 40.

The controller 40 of the system according to an exemplary embodiment of the present disclosure may be a processor (e.g., computer, microprocessor, CPU, ASIC, circuitry, logic circuits, etc.). The controller 40 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In a motor driving mode in which the motor 100 generates power for driving a vehicle, the DC terminal of the first inverter 10 and the DC terminal of the second inverter 20 are commonly connected to the battery 200. Therefore, the first inverter 10 and the second inverter 20 convert DC power stored in the battery 200 into three-phases AC power to supply the AC power to the motor 100, or convert regenerative braking energy generated by generation of regenerative braking torque of the motor 100 during regenerative braking into DC power and supply the DC power to the battery 200. Conversion between DC power and AC power may be performed by controlling pulse width modulation of the plurality of first switching elements S11 to S16 provided in the first inverter 10 and the plurality of second switching elements S21 to S26 provided in the second inverter 20.

The first inverter 10 may include a plurality of legs 11 to 13 to which the DC power generated in the DC terminal thereof is applied. The legs 11 to 13 may respectively correspond to the plurality of phases of the motor 100 to allow electrical connection.

More specifically, a first leg 11 includes two switching elements S11 and S12 connected in series with each other between the two node constituting the DC terminal of the first inverter 10. A connection node between the two switching elements S11 and S12 may be connected to a first end of one phase winding L1 in the motor 100 in order to input and output AC power corresponding to one phase among the plurality of phases of the motor 100.

Similarly, a second leg 12 includes two switching elements S13 and S14 connected in series with each other between the two nodes constituting the DC terminal of the first inverter 10. A connection node of the switching elements S13 and S14 may be connected to a first end of one phase winding L2 in the motor 100 in order to input and output AC power corresponding to one phase among the plurality of phases of the motor 100.

A third leg 13 includes two switching elements S15 and S16 connected in series with each other between the two modes constituting the DC terminal of the first inverter 10. A connection node of the two switching elements S15 and S16 may be connected to a first end of one phase winding L3 in the motor 100 in order to input and output AC power corresponding to one phase among the plurality of phases of the motor 100.

The second inverter 20 may also have a structure similar to the structure of the first inverter 10. The second inverter 20 may include a plurality of legs 21 to 23 to which the DC power of the DC terminal of the second inverter 20 is applied, in which the DC power between the two terminals of the battery 200 is applied to the DC terminal of the second inverter 20. The legs 21 to 23 may respectively correspond to the plurality of phases of the motor 100 to allow electrical connection.

More specifically, a first leg 21 includes two switching elements S21 and S22 connected in series with each other between the two node constituting the DC terminal of the first inverter 10. A connection node between the two switching elements S21 and S22 may be connected to a second end of the one phase winding L1 in the motor 100 in order to input and output AC power corresponding to one phase among the plurality of phases of the motor 100.

Similarly, a second leg 22 includes two switching elements S23 and S24 connected in series with each other between the two nodes constituting the DC terminal of the first inverter 10. A connection node of the switching elements S23 and S24 may be connected to a second end of the one phase winding L2 in the motor 100 in order to input and output AC power corresponding to one phase among the plurality of phases of the motor 100.

A third leg 23 includes two switching elements S25 and S26 connected in series with each other between the two modes constituting the DC terminal of the first inverter 10. A connection node of the two switching elements S25 and S26 may be connected to a second end of the one phase winding L3 in the motor 100 in order to input and output AC power corresponding to one phase among the plurality of phases of the motor 100.

The first inverter 10 is connected to the first ends of the windings L1 to L3 of the motor 100 and the second inverter 20 is connected to the second ends of the windings L1 to L3 of the motor 100. An electrical connection of an open end winding structure in which both ends of the windings L1 to L3 of the motor 100 are respectively connected to the first inverter 10 and the second inverter 20 may be provided.

The switching elements Sllto S16 included in the first inverter 10 and the switching elements S21 to S26 included in the second inverter 20 are switching elements included in a conventional inverter for driving a motor. The switching elements Sllto S16 and S21 to S26 may be understood as a concept including a diode connected in reverse between a source and a drain of IGBT or FET and IGBT or FET in which switching is actually performed.

The plurality of transfer switches S31 to S33 may be connected to the second ends of the windings L1 to L3 of the motor 100 (the AC terminal of the second inverter). First ends of the plurality of transfer switches S31 to S33 are connected to the second ends of the windings L1 to L3 of the motor 100. The second ends of the plurality of transfer switches S31 to S33 are electrically connected to each other to provide an electrical short.

When the plurality of transfer switches S31 to S33 are open-circuited, both ends of the windings L1 to L3 of the motor 100 are respectively connected to the first inverter 10 and the second inverter 20 to provide the open end winding structure. When the plurality of transfer switches S31 to S33 is short-circuited, the second ends of the windings L1 to L3 of the motor 100 are electrically short-circuited to each other. Therefore, the windings L1 to L3 of the motor 100 may provide electrical connection of a closed end winding structure providing Y-connection. When the electrical connection of the closed end winding structure is provided, the motor 100 may be driven by controlling pulse width modulation of the switching elements S11 to S16 of the first inverter 10. All the switching elements S21 to S26 of the second inverter 20 may always maintain an open state.

The plurality of transfer switches S31 to S33 serve to transfer a circuit connection structure for driving a motor between the open end winding structure and the closed end winding structure. Therefore, the plurality of transfer switches S31 to S33 may be collectively referred to as a transfer switch part 30.

The plurality of transfer switches S31 to S33 in the transfer switch part 30 should perform rapid switching for dropping the charging power supplied from the outside of the system during charging. Therefore, the plurality of transfer switches S31 to S33 may be realized as a MOSFET or an IGBT similar to the first switching elements or the second switching elements.

The controller 40 may control pulse width modulation of the switching elements S11 to S16 included in the first inverter 10 and of the switching elements S21 to S21 included in the second inverter 20, so that the motor 100 is driven on the basis of a required output required for the motor 100 in the motor driving mode.

More specifically, the controller 40 may determine an inverter used in motor driving on the basis of the required output of the motor 100, determine an on/off state of the plurality of transfer switches S31 to S33 of the transfer switch part 30, and control pulse width modulation of a switching element of the converter that is determined to be driven.

For example, when the output required for the motor 100 is less than a preset reference value, the controller 40 sets all the plurality of transfer switches S31 to S33 of the transfer switch part 30 into the short state, and does not operate the second inverter 20. The controller 40 controls pulse width modulation of the switching elements S11 to S16 of the first inverter 10, so that the motor 100 may be driven (closed end winding mode).

The motor driving in the closed end winding mode is achieved such that, the controller 40 controls pulse width modulation of the switching elements S11 to S16 of the first inverter 10, on the basis of the DC power applied to the DC terminal of the first inverter 10, phase voltage supplied from the AC terminal of the first inverter 10 to the motor 100, and a motor rotation angle detected by a motor rotor sensor (not shown) provided in the motor 100. Various techniques for driving the motor 100 by controlling the pulse width modulation of the plurality of switching elements in the inverter are already known in the art. Therefore, further detailed description of the pulse width modulation control method of the inverter will be omitted.

When the output required for the motor 100 is greater than the preset reference value, the controller 40 may set all the plurality of transfer switches S31 to S33 of the transfer switch part 30 into the open state, and operate both the first inverter 10 and the second inverter 20 to drive the motor 100 (open end winding mode). In the open end winding mode, the motor 100 may be driven when the first ends of the plurality of windings L1 to L3 are in the open state to each other and the second ends thereof are in the open state to each other, and pulse width modulation of the two inverters 10 and 20 respectively connected to the both ends of the windings L1 to L3 is controlled.

The motor driving in the open end winding mode is achieved such that, the controller 40 controls pulse width modulation of both the first switching elements S11 to S16 of the first inverter 10 and the second switching elements S21 to S26 of the second inverter 20 by receiving the DC power of the first inverter 10 and the second inverter 20, a phase current supplied to each of the plurality of windings, which correspond to each of phases of the motor 100, and a motor angle detected by motor rotor sensor (not shown) provided in the motor 100.

Various techniques for driving the motor by controlling the pulse width modulation of the two inverters connected to the opposite ends of the winding in the open end winding mode are already known in the art, so a further detailed description will be omitted.

In the charging mode for charging the battery, the controller 40 may control the switching elements S11 to S16, S21 to S26 included in the inverter 10, 20, the switches S31 to S33, and the charging powering switch R3. Therefore, a DC charging voltage is applied between the second ends of the plurality of transfer switches S31 to S33 and the negative terminal of the battery 200, and magnitude of the DC charging voltage is converted on the basis of magnitude of the DC charging voltage and then is supplied to the battery.

The DC power supplied from an external charger 300 may be applied between the node where the plurality of transfer switches S31 to S33 of the transfer switch part 30 are connected to each other and the node connected to the negative terminal of the battery 200. The charging voltage supplied from the external charger 300 may be applied between the node where the plurality of transfer switches S31 to S33 are connected to each other and the node connected to the negative terminal of the battery 200.

In order to provide or prevent electrical connection between the external charger 300 and the motor driving system, the embodiment of the present disclosure may include a charging powering switch R1, R2.

The vehicle may include a charging inlet to which the external charger 300 is connected. The charging inlet of the vehicle may be coupled to a charging outlet of the external charger 300 during charging. The charging outlet of the external charger 300 includes a high potential terminal (positive terminal) and a low potential terminal (negative terminal) that form the charging voltage. The high potential terminal and the low potential terminal of the charging outlet may be respectively connected to a high potential terminal and a low potential terminal of the charging inlet. The first charging powering switch R1 may be connected to a node where the high potential terminal of the charging inlet and the plurality of transfer switches S31 to S33 are connected to each other. The second charging powering switch R2 may be connected between the low potential terminal of the charging inlet and the negative terminal of the battery 200.

In the motor driving mode, the controller 40 may control the first charging powering switch R1 and the second charging powering switch R2 to be always in the open state. In addition, in the motor driving mode, the controller 40 may control the third charging powering switch R3 between the DC terminal of the first inverter 10 and the DC terminal of the second inverter 20 to be always in the short state.

In the battery charging mode, the controller 40 may control the first charging powering switch R1 and the second charging powering switch R2 to be always in the open state.

Depending on whether the charging voltage applied from the outside is boosted or dropped, the controller 40 may selectively control the state of the third charging powering switch R3.

As the first charging powering switch R1 to the third charging powering switch R3, various switching means known in the art may be applied. However, the first charging powering switch R1 to the third charging powering switch R3 are determined to be in an open or short state during determining mode switching or boost/step-down and are used to maintain the determined state thereof for the duration of the mode, so high-speed switching is not required. Therefore, the first charging powering switch R1 to the third charging powering switch R3 may be preferably realized in relays.

The first charging powering switch R1 and the second charging powering switch R2 may be realized in a junction box 400 provided for forming electrical connection in a circuit. For example, the junction box 400 may be realized as a hardware form that includes a wiring for forming electrical connection between the positive terminal and the negative terminal of the battery 200 and the two terminals of the DC terminal of each of the inverter, a wiring for connecting a capacitor C, which is provided to generate the charging voltage supplied from the external charger 300, to the junction box when the external charger 300 is connected to the junction box in the charging mode, a wiring between the first charging powering switch R1 and the second charging powering switch R2 and the external charger 300, and a wiring between the first charging powering switch R1 and the second charging powering switch R2, the switches S31 to S33, and the DC terminal of the inverter 10, 20.

Figure 2:
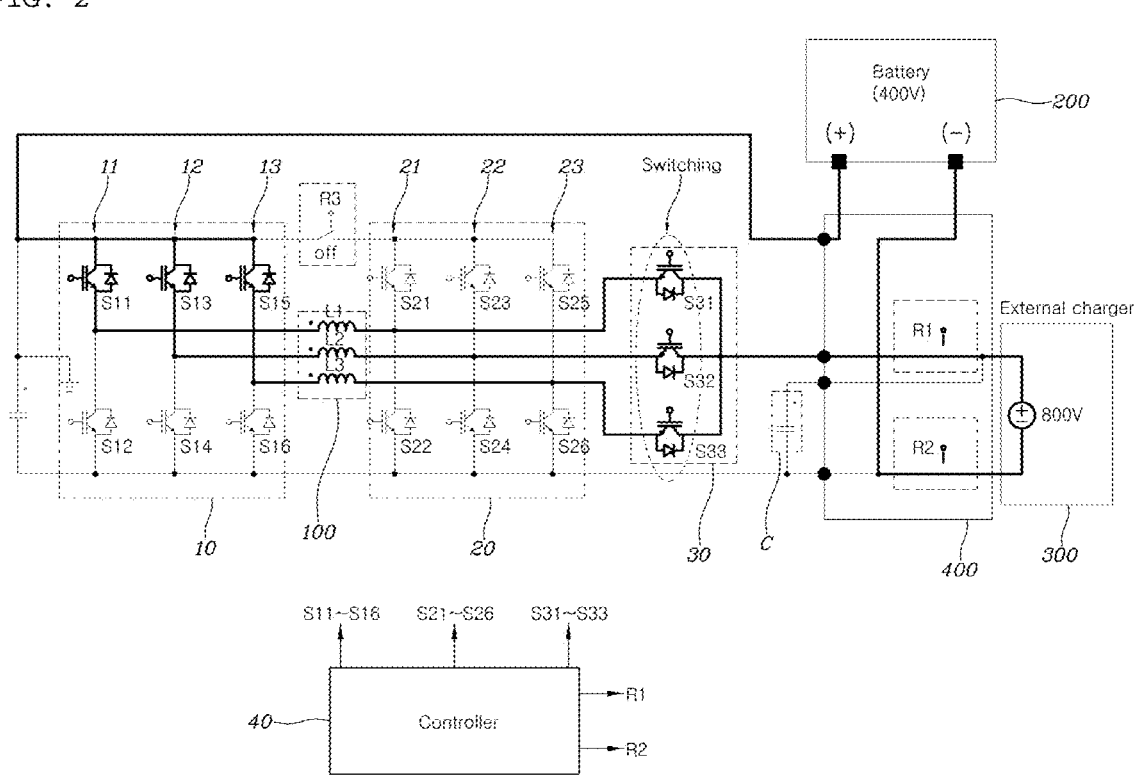
FIGS. 2 and 3 are views showing operation of the system for charging a vehicle battery using a motor driving system according to the embodiment of the present disclosure.
Figure 3:
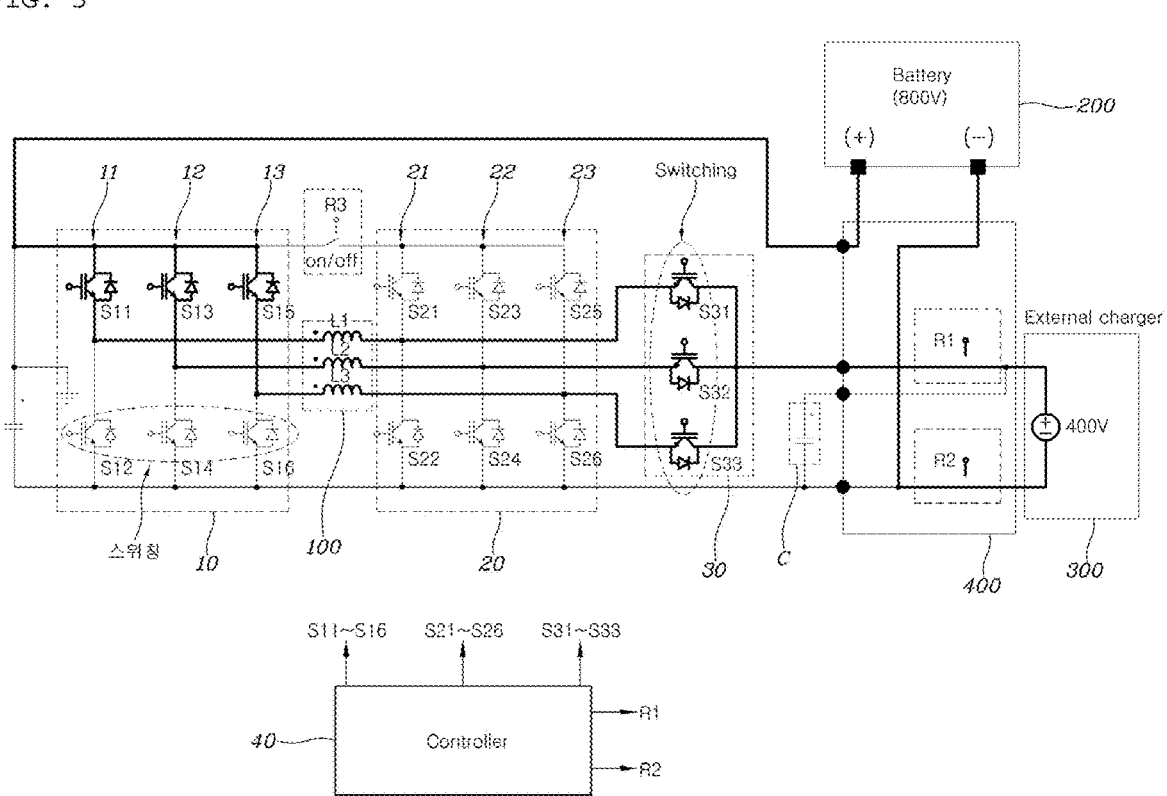

FIGS. 2 and 3 are views showing operation of the system for charging a vehicle battery using a motor driving system according to the embodiment of the present disclosure.

FIG. 2 is a view showing an example when the charging voltage supplied from the external charger 300 is lower than the voltage of the battery 200 in the vehicle in the charging mode.

As shown in FIG. 2, the controller 40 controls the charging powering switch R1, R2 into the short state in the charging mode. The controller 40 may control the switches S31, S32, and S33 of the transfer switch part 30 to maintain the short state.

Furthermore, when the charging voltage supplied from a charger 300 is lower than the voltage of the battery 200 in the vehicle, the controller 40 may control all of the switching elements S21 to S26 of the second inverter 20 to maintain the open state, and control the pulse width modulation of the lower switching elements S12, S14, and S16 of the first inverter 10 with an appropriate duty. Therefore, the charging voltage supplied from the charger 300 may be boosted and supplied to the battery.

The windings L1 to L3 of the motor 100, diodes of the upper switching elements S11, S13, and S15 of the first inverter 10 respectively connected to the first ends of the windings L1 to L3, and the lower switching elements S12, S14, and S16 of the first inverter 10 may provide topology of a boost converter that may step up the voltage in a direction from the external charger 300 to the battery 200. By using the topology of the boost converter, the charging voltage supplied from the external charger 300 may be boosted and be supplied to the battery 200, thereby achieving the charging of the battery 200.

In the above case, the voltage of the DC terminal of the second inverter 20 is greater than the voltage supplied from the external charger 300. Therefore, the current flowing into the second inverter 20 may be cut off by backward diodes of the upper switching elements S21, S23, and S25 of the second inverter 20. Therefore, when boosting of the external charging voltage is required, the third charging powering switch R3 may be in both the short state and the open state.

The upper switching element S11, S13, S15 means a switching element connected to the high potential terminal of the DC terminal in the two switching elements included in the leg in the inverter. The lower switching element means a switching element connected to the low potential terminal of the DC terminal.

FIG. 2 is a view showing an example in which all of the switches S31 to S33 of the transfer switch part 30 maintains the short state and then are boosted. However, the controller 40 may control part of the switches S31 to S33 of the transfer switch part 30 to be selectively turned to the short state and then control the pulse width modulation of the lower switching element connected to the switches in the short state, thereby allowing the switches S31 to S33 to be boosted.

In boosting, all the switches S31, S31, and S33 of the transfer switch part 30 corresponding to each phase of the motor are controlled to be maintained in the short state. When all the lower switches S12, S14, and S16 of the first inverter 10 are switched and boosted, the controller 40 may control a boost converter corresponding to each phase of the motor by an interleaved method.

The boost converter, which includes a coil (inductor), a diode, and a switch to increase the voltage through pulse width modulation control of the switch, and the interleaved control method using a plurality of boost converters are well known in the art. Therefore, a further description thereof will be omitted.

FIG. 3 shows an example when the charging voltage supplied from the external charger 300 is greater than the voltage of the battery 200 in the vehicle in the charging mode, i.e., an example when the charging voltage needs to be stepped down.

As shown in FIG. 3, in the charging mode, the controller 40 may control both the first and second charging powering switches R1 and R2 to be in the short state, control the third charging powering switch R3 to be in the open state, control all the first switching elements S11 to S16 and the second switching elements S21 to S26 to be in the open state, and control the pulse width modulation of at least some of the switches S31, S32, and S33 of the transfer switch part 30 with an appropriate duty.

The switches S31, S32, and S33 of the transfer switch part 30, the windings L1 to L3 of the motor 100, the diode of the lower switching elements S22, S24, and S26 of the second inverter 20, and the upper switching elements S11, S13, and S15 of the first inverter 10 may form a topology of a buck converter, which may step down the voltage in a direction from the external charger 300 toward the battery 200. As the pulse width modulation of at least some of the switches S31 to S33 of the transfer switch part 30 is controlled by appropriately determining the duty thereof, the magnitude of the voltage supplied to the battery 200 may be appropriately controlled.

Furthermore, as in the case of boosting, the voltage may be converted by controlling all the switches S31, S32, and S33 of the transfer switch part 30 and operating three buck converters in the interleaved method.

In the step-down control, the voltage applied to the second ends of the windings L1 to L3 of the motor 100 is greater than the voltage of the battery. Therefore, the current may flow by the diode of the upper switching elements of the second inverter 20, so the third charging powering switch R3 must be controlled in the open state.

As described above, according to the various embodiments of the present disclosure, the system for charging a vehicle battery using a motor driving system may allow the battery to be charged by appropriately converting the magnitude of the charging voltage in response to the charging voltage supplied from the external charger by using the motor driving system provided for the open end winding operation of the motor.

Therefore, according to the various embodiments of the present disclosure, the system for charging a vehicle battery using a motor driving system is configured such that, as the voltage of the vehicle battery increases, it is not necessary to provide additional infrastructure for additional high-voltage charging facilities in the vehicle. Therefore, social costs caused by infrastructure construction may be prevented.

furthermore, according to the various embodiments of the present disclosure, the system for charging a vehicle battery using a motor driving system is configured such that, when the charging voltage supplied from the charging equipment is higher than the voltage of the battery, instead of stepping down the voltage of the charging equipment having current limitation, the charging system may step down the magnitude of the voltage by using the motor driving system provided in the vehicle. Therefore, the problem of charging power reduction that occurs when the charging voltage is stepped down at the charging equipment may be solved, whereby it is possible to solve the problem that the battery charging time increases due to the charging voltage step-down.

In addition, according to the various embodiments of the present disclosure, the system for charging a vehicle battery using a motor driving system is configured to allow the battery charging corresponding to various types of external charging voltage while allowing the motor driving in the high-efficiency open end winding manner.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for charging a vehicle battery using a motor driving system, the motor driving system being configured to drive a motor having a plurality of windings respectively corresponding to a plurality of phases of the motor, the system comprising:

a first inverter comprising a plurality of first switching elements, and comprising a DC terminal connected to the vehicle battery and an AC terminal connected to a first end of each of the plurality of windings;

a second inverter comprising a plurality of second switching elements, and comprising a DC terminal that is selectively short/open-circuited to the DC terminal of the first inverter and an AC terminal connected to a second end of each of the plurality of windings;

a plurality of transfer switches having first ends and second ends, the first ends of the plurality of transfer switches being respectively connected to the second ends of the plurality of windings, and the second ends of the transfer switches being connected to each other;

a controller configured, in a charging mode in which the vehicle battery is charged, to control a connection state between the DC terminal of the first inverter and the DC terminal of the second inverter and opened/shorted states of the plurality of first switching elements, the plurality of second switching elements, and the plurality of transfer switches, based on a magnitude of DC charging voltage applied to a portion between the second ends of the plurality of transfer switches and a negative terminal of the vehicle battery and a magnitude of voltage of the vehicle battery; and a first charging powering switch including a first end connected to the second ends of the plurality of transfer switches and a second end receiving high potential of the DC charging voltage, and a second charging powering switch including a first end connected to the negative terminal of the vehicle battery and a second end receiving low potential of the DC charging voltage, wherein the controller is configured, in the charging mode, to control the first charging powering switch and the second charging powering switch to be short-circuited.

2. The vehicle battery charging system of claim 1, further comprising a capacitor connected to a portion between the second end of the first charging powering switch and the negative terminal of the vehicle battery.

3. The vehicle battery charging system of claim 1, wherein when the external charging voltage is lower than the voltage of the vehicle battery, the controller is further configured, in the charging mode, to boost the DC charging voltage by controlling at least some of the plurality of transfer switches to be short-circuited, and by controlling pulse width modulation of a lower switching element of the first inverter, which is connected to a winding of the plurality of windings connected to a short-circuited switch among the plurality of transfer switches, wherein the lower switching element of the first inverter is a switching element connected to a low potential terminal of the DC terminal of the first inverter, among the plurality of first switching elements.

4. The vehicle battery charging system of claim 3, wherein the controller is further configured, in the charging mode, to control the plurality of second switching elements to be open-circuited.

5. The vehicle battery charging system of claim 1, wherein when the external charging voltage is lower than the voltage of the vehicle battery, the controller is further configured, in the charging mode, to boost the DC charging voltage by controlling all the plurality of transfer switches to be short-circuited, and by controlling pulse width modulation of a lower switching element of the first inverter, wherein among the plurality of first switching elements, the lower switching element of the first inverter is a switching element connected to a low potential terminal of the DC terminal of the first inverter.

6. The vehicle battery charging system of claim 5, wherein the controller is further configured, in the charging mode, to control the plurality of second switching elements to be open-circuited.

7. The vehicle battery charging system of claim 1, wherein when the external charging voltage is greater than the voltage of the vehicle battery, the controller is further configured, in the charging mode, to step down the DC charging voltage by electrically opening the DC terminal of the first inverter and the DC terminal of the second inverter to each other, and by opening the plurality of first switching elements and the plurality of second switching elements, and by controlling pulse width modulation of at least some of the plurality of transfer switches.

8. The vehicle battery charging system of claim 1, further comprising:

a third charging powering switch including a first end connected to the DC terminal of the first inverter and a second end connected to the DC terminal of the second inverter.

9. The vehicle battery charging system of claim 8, wherein when the external charging voltage is greater than the voltage of the vehicle battery, the controller is further configured, in the charging mode, to step down the DC charging voltage by opening the third charging powering switch, by opening the plurality of first switching elements and the plurality of second switching elements, and by controlling pulse width modulation of at least some of the plurality of transfer switches.

10. A system for charging a vehicle battery using a motor driving system, the motor driving system being configured to drive a motor having a plurality of windings respectively corresponding to a plurality of phases of the motor, the system comprising:

a first inverter comprising a plurality of first switching elements, and comprising a DC terminal connected to the vehicle battery and an AC terminal connected to a first end of each of the plurality of windings;

a second inverter comprising a plurality of second switching elements, and comprising a DC terminal that is selectively short/open-circuited to the DC terminal of the first inverter and an AC terminal connected to a second end of each of the plurality of windings;

a plurality of transfer switches having first ends and second ends, the first ends of the transfer switches being respectively connected to the second ends of the plurality of windings, and the second ends of the transfer switches being connected to each other;

a first charging powering switch including a first end connected to the second ends of the plurality of transfer switches and a second end receiving high potential of the DC charging voltage supplied from an outside of the system;

a second charging powering switch including a first end connected to the negative terminal of the vehicle battery and a second end receiving low potential of the DC charging voltage;

a third charging powering switch including a first end connected to the DC terminal of the first inverter and a second end connected to the DC terminal of the second inverter; and a controller configured, in a charging mode in which the vehicle battery is charged, to control at least some of the plurality of transfer switches and the first and second charging powering switches to be short-circuited, the controller being further configured, based on a magnitude of the DC charging voltage, to control opened/shorted states of the third charging powering switch, the plurality of first switching elements, the plurality of second switching elements, and the plurality of transfer switches.

11. The vehicle battery charging system of claim 10, further comprising a capacitor connected to a portion between the second end of the first charging powering switch and the negative terminal of the vehicle battery.

12. The vehicle battery charging system of claim 10, wherein when the external charging voltage is lower than the voltage of the vehicle battery, the controller is further configured, in the charging mode, to boost the DC charging voltage by controlling at least some of the plurality of transfer switches to be short-circuited, and by controlling pulse width modulation of a lower switching element of the first inverter, which is connected to a winding of the plurality of windings connected to a shorted switch among the plurality of transfer switches, wherein among the plurality of first switching elements, the lower switching element of the first inverter is a switching element connected to a low potential terminal of the DC terminal of the first inverter.

13. The vehicle battery charging system of claim 12, wherein the controller is further configured, in the charging mode, to control the plurality of second switching elements to be open-circuited.

14. The vehicle battery charging system of claim 10, wherein when the external charging voltage is lower than the voltage of the vehicle battery, the controller is further configured, in the charging mode, to boost the DC charging voltage by controlling all the plurality of transfer switches to be short-circuited, and by controlling pulse width modulation of a lower switching element of the first inverter, wherein among the plurality of first switching elements, the lower switching element of the first inverter is a switching element connected to a low potential terminal of the DC terminal of the first inverter.

15. The vehicle battery charging system of claim 14, wherein the controller is further configured, in the charging mode, to control the plurality of second switching elements to be open-circuited.

16. The vehicle battery charging system of claim 10, wherein when the external charging voltage is greater than the voltage of the vehicle battery, the controller is further configured, in the charging mode, to step down the DC charging voltage by opening the third charging powering switch, and by opening the plurality of first switching elements and the plurality of second switching elements, and by controlling pulse width modulation of at least some of the plurality of transfer switches.

* * * * *